United States Patent
Wahlström (10) Patent No.: US 11,143,084 B2
(45) Date of Patent: Oct. 12, 2021

(54) EXHAUST AFTERTREATMENT SYSTEM FOR A COMBUSTION ENGINE

(71) Applicant: VOLVO TRUCK CORPORATION, Gothenburg (SE)

(72) Inventor: Gert-Ove Wahlström, Askim (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/976,347

(22) PCT Filed: Apr. 5, 2018

(86) PCT No.: PCT/EP2018/025094
§ 371 (c)(1),
(2) Date: Aug. 27, 2020

(87) PCT Pub. No.: WO2019/192668
PCT Pub. Date: Oct. 10, 2019

(65) Prior Publication Data
US 2021/0040876 A1    Feb. 11, 2021

(51) Int. Cl.
*F01N 13/00*    (2010.01)
*F01N 3/08*    (2006.01)
(Continued)

(52) U.S. Cl.
CPC ......... *F01N 13/017* (2014.06); *F01N 3/0814* (2013.01); *F01N 3/106* (2013.01);
(Continued)

(58) Field of Classification Search
CPC combination set(s) only.
See application file for complete search history.

(56) References Cited

U.S. PATENT DOCUMENTS 5,285,640 A * 2/1994 Olivo .................... F01N 3/2006
  60/274
5,732,555 A * 3/1998 Gracyalny ............ F01N 3/2885
  60/299
(Continued)

FOREIGN PATENT DOCUMENTS

EP    1728984 A2    12/2006
EP    2960454 A1    12/2015
(Continued)

OTHER PUBLICATIONS

International Search Report and Written Opinion dated Jun. 20, 2018 in corresponding International PCT Application No. PCT/EP2018/025094, 8 pages.

*Primary Examiner* — Binh Q Tran
(74) *Attorney, Agent, or Firm* — Venable LLP; Jeffii A. Kaminski (57) ABSTRACT

The invention relates to an exhaust aftertreatment system (1) for a combustion engine (110), comprising, an outer casing (2) comprising at least one exhaust gas inlet (3) and at least one exhaust gas outlet (4), at least one catalyst (6, 6') being located in an inner volume (5) of the outer casing (2), wherein the system (1) is configured such that during use of the system (1) exhaust gas flows from the at least one exhaust gas inlet (3) at an inlet velocity, through the at least one catalyst (6, 6') at a catalyst velocity, into the inner volume (5) outside the at least one catalyst (6, 6') and to the at least one exhaust gas outlet (4), and further such that the exhaust gas flows in the inner volume (5) outside the at least one catalyst (6, 6) through at least one cross sectional area (A) being defined and limited by at least a perimeter surface (61, 61') of the at least one catalyst (6, 6') and an inner surface (21) of the outer casing (2) or by at least two catalyst parameter surfaces (61, 61'), wherein the at least one cross sectional area (A) is sized such that during use of the system (Continued)

(1) the exhaust gas flows through the at least one cross sectional area (A) at a first inner volume velocity being higher than the catalyst velocity, and wherein the system (1) further comprises at least one sensor (7) for measuring at least one parameter being related to the exhaust gas, said at least one sensor (7) being located in the inner volume (5) at a location where an exhaust gas flow velocity is higher than the catalyst velocity. The invention also relates to a vehicle (100) comprising such a system (1).

21 Claims, 4 Drawing Sheets (51) Int. Cl.
F01N 3/10 (2006.01)
F01N 3/20 (2006.01)
F01N 3/28 (2006.01)

(52) U.S. Cl.
CPC ......... F01N 3/2066 (2013.01); F01N 3/2892 (2013.01); F01N 13/008 (2013.01); F01N 2250/02 (2013.01); F01N 2560/026 (2013.01); F01N 2560/05 (2013.01); F01N 2560/06 (2013.01)

(56) References Cited

U.S. PATENT DOCUMENTS

| | | | |
|---|---|---|---|
| 10,823,033 B2 * | 11/2020 | Henzler | F01N 3/103 |
| 2004/0202590 A1 * | 10/2004 | Jacab | B01D 53/9431 |
| | | | 422/177 |
| 2006/0008397 A1 * | 1/2006 | Bruck | F01N 3/2821 |
| | | | 422/180 |
| 2010/0263352 A1 * | 10/2010 | Hylands | F02D 19/105 |
| | | | 60/273 |
| 2011/0072806 A1 * | 3/2011 | Nagaoka | F01N 3/02 |
| | | | 60/301 |
| 2013/0247545 A1 * | 9/2013 | Solbrig | F01N 3/208 |
| | | | 60/295 |

FOREIGN PATENT DOCUMENTS

| | | |
|---|---|---|
| WO | 2005001252 A1 | 1/2005 |
| WO | 2016044084 A1 | 3/2016 |

* cited by examiner

EXHAUST AFTERTREATMENT SYSTEM FOR A COMBUSTION ENGINE

CROSS-REFERENCE TO RELATED APPLICATIONS

This application is a U.S. National Stage application of PCT/EP2018/025094, filed Apr. 5, 2018, and published on Oct. 10, 2019, as WO 2019/192668 A1, all of which is hereby incorporated by reference in its entirety.

TECHNICAL FIELD

The invention relates to an exhaust aftertreatment system for a combustion engine, such as a diesel engine. The invention further relates to a vehicle comprising such system.

The invention can be applied in heavy-duty vehicles, such as trucks, buses and construction equipment. Although the invention mainly will be described with respect to a truck, the invention is not restricted to this particular vehicle, but may also be used in other vehicles comprising a combustion engine.

BACKGROUND

Exhaust aftertreatment systems (EATS), also known as mufflers, are well known and used in connection with combustion engines in vehicles for cleaning exhaust gas from the engine, noise reduction etc.

The systems are typically built up by an outer casing which encloses a number of different components which the exhaust gas will pass through until it reaches a tailpipe connected to the outer casing. The components inside the outer casing may for example be catalysts, such as selective catalytic reduction (SCR) catalysts, diesel oxidation catalysts, and also particle filters for reducing the amount of particles exiting the tailpipe.

Moreover, typically sensors are needed for controlling the aftertreatment system. Some of these sensors are commonly placed in the tailpipe outside the outer casing. The tailpipe is most often located outside the outer casing, but there are also known designs where the tailpipe is integrated into the outer casing, wherein the sensors then are mounted in the integrated tailpipe.

SUMMARY

An object of the present invention is to provide an improved exhaust aftertreatment system which at least partly alleviates the drawbacks of the prior art, or provides a useful alternative.

The object is achieved by the subject matter as provided in the independent claims. Preferred and advantageous embodiments may be found in the dependent claims and in the accompanying description and drawings.

According to a first aspect, the object is achieved by an exhaust aftertreatment system for a combustion engine, the system comprising an outer casing comprising at least one exhaust gas inlet and at least one exhaust gas outlet, and further comprising at least one catalyst being located in an inner volume of the outer casing. The system is configured such that during use of the system exhaust gas flows from the at least one exhaust gas inlet at an inlet velocity, through the at least one catalyst at a catalyst velocity, into the inner volume outside the at least one catalyst and to the at least one exhaust gas outlet, and further such that the exhaust gas flows in the inner volume outside the at least one catalyst through at least one cross sectional area being defined and limited by at least a perimeter surface of the at least one catalyst and an inner surface of the outer casing or by at least two catalyst parameter surfaces. Optionally, the system may be configured such that a total flow of the exhaust gas flows in the inner volume outside the at least one catalyst through the at least one cross sectional area. Hence, the at least one cross sectional area may be a cross section for the total gas flow. Moreover, the at least one cross sectional area is sized such that during use of the system the exhaust gas flows through the at least one cross sectional area at a first inner volume velocity being higher than the catalyst velocity, and wherein the system further comprises at least one sensor for measuring at least one parameter being related to the exhaust gas, said at least one sensor being located in the inner volume at a location where an exhaust gas flow velocity is higher than the catalyst velocity.

By the provision of a system as disclosed herein, an improved exhaust aftertreatment system is provided which reduces or even eliminates the need of having a tailpipe connected to the exhaust gas outlet. A tailpipe as used herein may also be denoted an exhaust pipe, which is a pipe which commonly is directly coupled to the exhaust aftertreatment system. Such pipe may be directed in any direction in respect of the vehicle. In prior art designs, a tailpipe, either externally or internally mounted in respect of the outer casing, has been used for controlling the exhaust gas flow downstream the at least one catalyst. Moreover, sensors are also normally positioned in such tailpipes for measuring parameters related to the exhaust gas flow. The reason for positioning the sensors in the tailpipe in systems of prior art is that the exhaust gas flow velocity increases therein and the sensors are normally functioning better when the exhaust gas flow is higher. According to the invention, the catalyst's perimeter profile and/or the outer casing's inner surface may be used to design a cross sectional area in the inner volume such that a virtual tailpipe will be provided therein. More particularly, the exhaust gas flow velocity can be controlled by adjusting the size of the at least one cross sectional area. The shape of the at least one cross sectional area may also influence the gas flow. Typically, the at least one cross sectional area is shared between a plurality of flow channels in the inner volume. Hence, the at least one cross sectional area may be formed by one or a plurality of flow channels, such as 1, 2, 3, 4, 5, 6 or more flow channels. The at least one cross sectional area may be defined as a minimum total cross sectional area which the total flow of the exhaust gas will pass through in the inner volume. By the configuration of the system, the sensors may be advantageously placed in the inner volume where the exhaust gas flows downstream the at least one catalyst, and therefore also the need of having tailpipes is reduced, or even eliminated. Moreover, tailpipes are also normally used for controlling the acoustics of the system. By the provision of the present invention, the acoustics may also be controlled such that it may be similar to a standard tailpipe. Eliminating the need of a tailpipe provides several benefits, such as reduced weight and cost. Another benefit is that the pressure loss of a tailpipe, which increase the fuel consumption, is eliminated.

Optionally, the system may be configured such that during use the exhaust gas flows through the at least one cross sectional area in a direction being substantially perpendicular to the length direction of the at least one catalyst. Directing the flow like this may be beneficial in accomplishing the cross sectional area in a way such that the flow velocity increases to a magnitude which is similar to what a tailpipe would have, thereby using the inner volume to generate a virtual tailpipe.

Optionally, the first inner volume velocity may be at least 80%, 90%, or 100% higher than the catalyst velocity. Hence, a significant increase of the velocity may be obtained downstream the at least one catalyst in order to generate a velocity which is similar to what a normal tailpipe would have, thereby providing similar conditions in the inner volume.

Optionally, the size of the at least one cross sectional area may be in a range from 30% to 300% of an inlet area of the at least one exhaust gas inlet. Hence, by sizing the at least one cross sectional area like this a suitable exhaust gas flow velocity may be generated downstream the at least one catalyst.

Optionally, the system may comprise at least two catalysts, preferably being arranged substantially parallel in respect of each other.

Optionally, the at least one catalyst may be a selective catalytic reduction (SCR) catalyst.

Optionally, the system may further comprise at least one of a diesel oxidation catalyst (DOC) located upstream the at least one catalyst and at least one particle filter located upstream the at least one catalyst. Alternatively, these components may also be located downstream the at least one catalyst.

Optionally, the system may further comprise at least one baffle located in the inner volume and configured for further defining and limiting the at least one cross sectional area. A baffle may be defined as an inner wall of the outer casing which is used for controlling and directing the exhaust gas flow. Still optionally, the at least one baffle may be defined by a plane being substantially perpendicular to the length direction of the at least one catalyst. The at least one baffle may provide an increased flexibility in creating a suitable cross sectional area may be accomplished.

Optionally, the system may further comprise a duct for the exhaust gas flow in the inner volume extending from the exhaust gas inlet and being located upstream in respect of the at least one catalyst. Still optionally, the at least one duct may be configured for further defining and limiting the at least one cross sectional area. Thereby, an even increased flexibility may be provided for designing the at least one cross sectional area in a suitable manner. Purely by way of examples, the at least one duct may be shaped differently, such as a straight pipe, a bent pipe, e.g a U-shaped profile, or any other suitable shape. The duct may be shaped for controlling whereto and how the exhaust gas flow shall be directed, and also for fitting purposes inside the outer casing. Optionally the duct may also be designed for injection, mixing and/or evaporation of a reduction agent, such as urea water solution.

Optionally, the exhaust gas outlet may be a final exhaust gas outlet for the exhaust gas. A final exhaust gas outlet means herein that there are no further pipes or the like connected to the exhaust gas outlet. Hence, the exhaust gas exits directly out into the ambient air. Still optionally, the exhaust gas outlet may be pointing substantially downwards when the system is mounted to a vehicle, such as to a truck. The inventor has further realized that directing the flow such that it exits downwards is beneficial for controlling and directing the low inside the outer casing. It may also be beneficial to direct the exhaust gas substantially downwards when mounted to a vehicle.

Optionally, the at least one catalyst may comprise a substantially circular, elliptical or oval perimeter profile in a cross section along the length direction of the at least one catalyst. For example, when the exhaust gas flow in the inner volume downstream the at least one catalyst is in a direction which is essentially perpendicular to the length direction of the at least one catalyst, an oval, elliptical or circular perimeter profile may be beneficial for controlling the flow. More particularly, such shapes may lead to that the exhaust gas enters a tapering volume, i.e. the cross section therein may be reduced until it reaches the at least one cross sectional area as disclosed herein, and thereafter the inner volume's cross section will increase again. In other words, a funnel-shape may be accomplished in the inner volume outside the at least one catalyst where the exhaust gas flows.

Optionally, the at least one sensor may be a sensor for measuring at least one of temperature, NOx level and particle level of the exhaust gas. These parameters may be important for controlling the system in a suitable manner.

Optionally, the at least one sensor may be connected to the outer casing. Connecting the at least one sensor to the outer casing may facilitate the mounting procedure of the at least one sensor and also allow the at least one sensor to be placed in a position which is beneficial for the measuring.

Optionally, the inner volume may comprise an additional flow channel, wherein the at least one sensor is located in said additional flow channel. Providing an additional flow channel may further facilitate the controlling of the exhaust gas flow in the inner volume. An additional flow channel as disclosed herein shall not be regarded as an internal/integrated tailpipe, since according to the invention the size of the cross sectional area is designed by the perimeter profile(s) of the at least one catalyst and/or the inner wall(s) of the outer casing.

Optionally, an absorptive material may be placed in the inner volume where the increased flow velocity is occurring. Thereby the noise level may be further reduced. The absorptive material will also decrease the at least one cross sectional area, i.e. the minimum total cross sectional area will be further reduced.

Optionally, the at least one sensor may be located in the inner volume at a location where an exhaust gas flow velocity is at least 80% of the first inner volume velocity. Hence, the at least one sensor may be positioned close to the above-mentioned cross sectional area, which likely is the smallest total cross sectional area in the inner volume which the total flow of the exhaust gas passes through. As already mentioned hereinabove, the at least one sensor may be advantageously positioned where an exhaust gas flow velocity is high in order to function properly. Still optionally, the at least one sensor may be located in the inner volume at a location where an exhaust gas flow velocity is at least 90% or 95% of the first inner volume velocity, which may be the maximum velocity in the inner volume.

Optionally, the at least one sensor may be located in the proximity of the at least one cross-sectional area. Purely by way of example, the at least one sensor may be located 25, 20, 15 or 10 centimeters or less from the at least one cross sectional area.

Optionally, a diffusing device may be arranged on the exhaust gas outlet. This may be especially beneficial when the exhaust gas outlet is pointing downwards as mentioned hereinabove. The diffusing device may be arranged to change the direction of the exhaust gas flow when exiting the outer casing.

Optionally, the system may further comprise an additional exhaust gas flow outlet which is designed to be connectable to an exhaust gas extraction equipment used in service workshops. Such an outlet may advantageously be closed by a lid during normal use of the system.

Optionally, the inner volume, into which the exhaust gas flows downstream the at least one catalyst, may be regarded as an open inner volume. More particularly, the open inner volume may be defined as an open inner volume being defined and limited by the outer casing's inner wall and the other components placed inside the outer casing, e.g. the at least one catalyst and any other components placed therein. Still optionally, an integrated tailpipe, any other pipe or the like, inside the outer casing may also be used for defining and limiting the open inner volume.

According to a second aspect, a vehicle is provided which comprises the system according to any one of the embodiments of the first aspect. It shall be noted that all embodiments of the second aspect are applicable to the first aspect and vice versa. Optionally, the vehicle may be anyone of a truck, a bus, a constructional equipment vehicle etc.

BRIEF DESCRIPTION OF THE DRAWINGS

With reference to the appended drawings, below follows a more detailed description of embodiments of the invention cited as examples.

In the drawings.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

Figure 1:
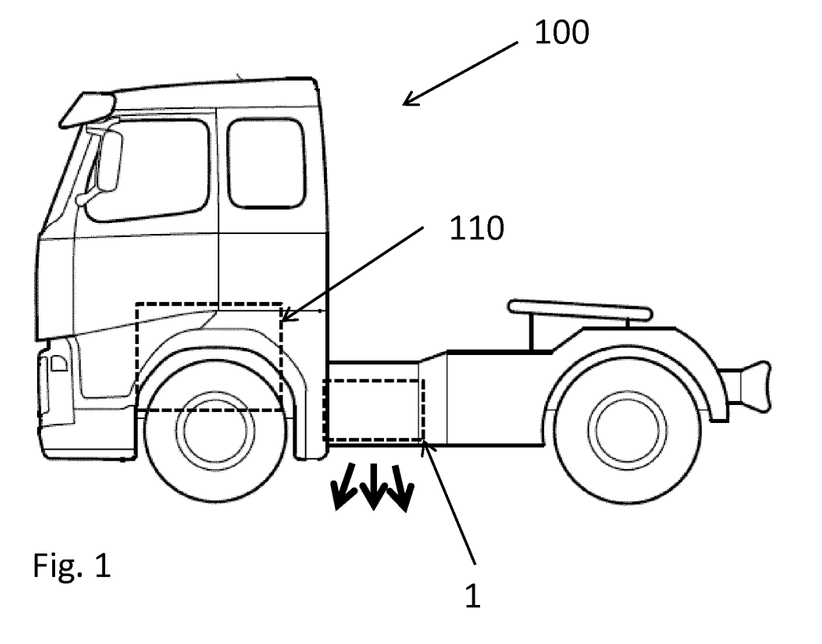
FIG. 1 is showing a vehicle in the form of a truck according to an example embodiment of the present invention.

In FIG. 1, a vehicle 100 in the form of a truck comprising a diesel combustion engine 110 is depicted. The diesel engine 110, illustrated by a dashed line box, generates exhaust gases which are transferred to an exhaust aftertreatment system 1, also illustrated by a dashed line box, which also is known as an EATS or muffler. The exhaust gases exit the system 1 via an outlet (not shown) such that the gases are directed downwards, indicated by the thick arrows, in respect of the truck 100. As mentioned hereinabove, the system 1 may comprise a diffuser (not shown) which changes the direction of the flow when exiting the system 1, such as rearwards in respect of the truck 100. By the provision of the system 1 as disclosed herein, a tailpipe may not need to be connected to the system 1, since the system 1 is designed such that a virtual tailpipe is comprised in the system 1.

Figure 2:
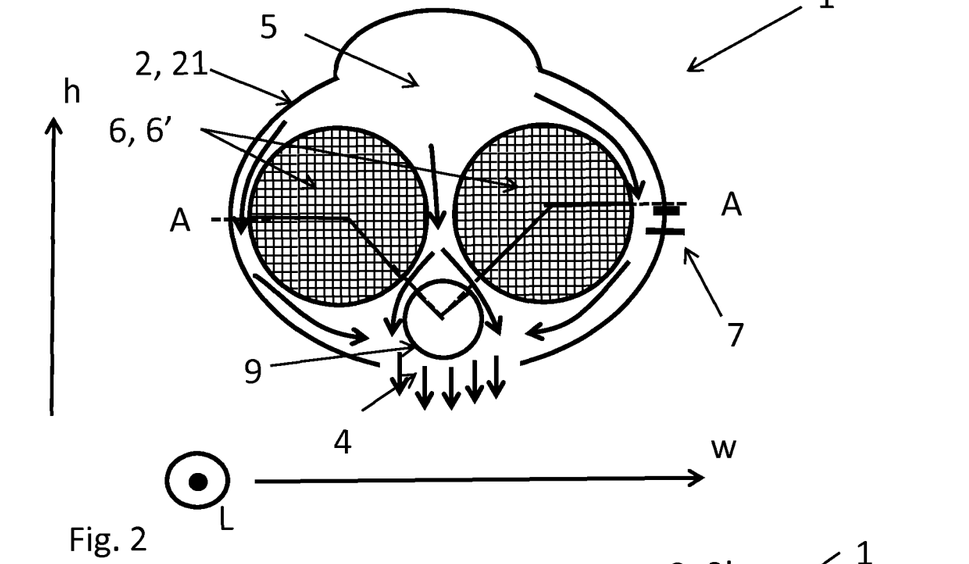
FIG. 2 is showing a cross sectional view of an exhaust aftertreatment system according to an example embodiment of the present invention.

Now turning to FIG. 2, a system 1 according to an example embodiment is shown. The figure shows a cross section along a length direction L of the system 1. The direction L extends out from the paper as indicated by the encircled dot. As can be seen, the system 1 extends in a width direction w and in a height direction h, whereby the height direction may correspond to a vertical direction of the vehicle 100 when mounted thereon. The directions L, w and h are essentially perpendicular to each other and may also be regarded as a Cartesian coordinate system. The system 1 comprises an outer casing 2 which comprises one exhaust gas inlet 3 (see e.g. FIG. 3) and at least one exhaust gas outlet 4, and further the system 1 comprises two catalysts 6 and 6' which are located in an inner volume 5 of the outer casing 2. The system 1 is configured such that during use exhaust gas flows from the exhaust gas inlet 3 at an inlet velocity, through the two catalysts 6 and 6' at a catalyst velocity, into the inner volume 5 outside the two catalysts 6 and 6' and to the exhaust gas outlet 4. The exhaust gas flow is in all of the figures represented by the thick arrows. Moreover, the system 1 is further configured such that the exhaust gas flows in the inner volume 5 outside the two catalysts 6 and 6' through a cross sectional area A which is defined and limited by perimeter surfaces 61 and 61' of the two catalysts 6 and 6', by an inner surface 21 of the outer casing 2 and by the perimeter surface of the pipe 9. In the figure it can be seen how the cross sectional area A extends in the width direction w of the system (indicated by a line). Moreover, the cross sectional area A is sized such that during use of the system 1 the exhaust gas flows through the cross sectional area A at a first inner volume velocity which is higher than the catalyst velocity, and wherein the system 1 further comprises at least one sensor 7 for measuring at least one parameter being related to the exhaust gas F, said at least one sensor 7 being located in the inner volume 5 at a location where an exhaust gas flow velocity is higher than the catalyst velocity. The cross sectional area A is here represented by four flow channels in the inner volume 5 outside the two catalysts 6 and 6'. As can be seen in FIG. 2, the sensor 7 is here mounted at, or very close to, the cross sectional area A, which also is the smallest total cross sectional area that the exhaust gas passes through when passing by outside the two catalysts 6 and 6'. As can be further seen, the exhaust gas flows by the two catalysts 6 and 6' substantially in the height direction h of the system 1 and thereafter exits the outlet 4 which is located in the bottom below the two catalysts 6 and 6'. Due to the circular shape of the catalysts 6 and 6' and the shape of the inner wall 21, the exhaust gas flows into a funnel-shaped volume, whereby the flow velocity increases when passing through the cross sectional area A.

Figure 3:
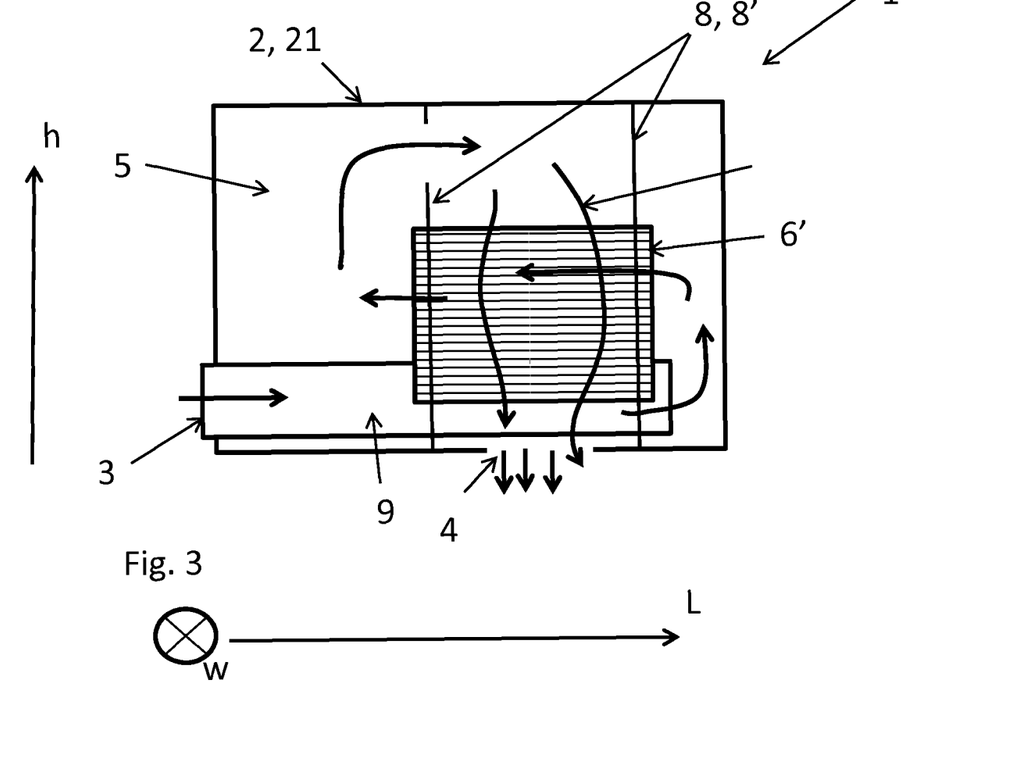
FIG. 3 is showing another cross sectional view of the system as depicted in FIG. 2.

In FIG. 3, a side view of the system 1 as shown in FIG. 2 is depicted. Here it can be seen in more detail how the flow streams in the system 1. The exhaust gas enters an inlet 3, which in this embodiment is an inlet of a pipe/duct 9 located substantially inside the outer casing 2. The pipe 9 is arranged in the length direction L. Downstream the pipe 9 are the two catalysts 6 and 6' arranged, and as can be seen, the exhaust gas passes through the catalysts 6 and 6' along the length direction L, however in the opposite direction to the direction in the pipe 9. The length direction of the catalysts 6 and 6' correspond to the length direction L of the system 1. Thereafter, the exhaust gas flows upwards along the height direction h in the inner volume 5 and then makes a "U-turn", passes outside the catalysts 6 and 6' along the height direction h to thereafter exit via the outlet 4. For the sake of clarity, other components, such as particle filter(s), DOC's, Urea-injection device(s) etc. which may be part of the system 1 are omitted in the drawings. The exhaust gas flow may therefore also pass outside such components when passing through the at least one cross sectional area A. Moreover, in this embodiment, two baffles 8 and 8' are also placed in the inner volume 5 to direct the flow and to define and limit the cross sectional area A, which is further detailed in FIG. 4.

Figure 4:
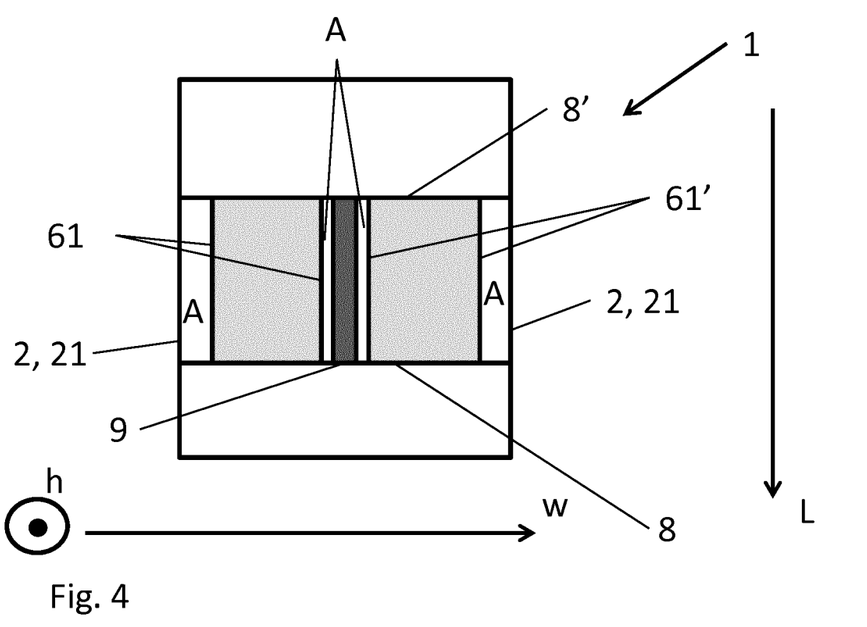
FIG. 4 is showing another cross sectional view of a system according to an example embodiment of the present invention.

FIG. 4 shows a view from above in the height direction h, wherein the cross sectional area A is depicted, presenting four separate flow channels. As can be seen, the cross sectional area A is defined and limited by the two catalysts' 6 and 6' perimeter surfaces 61 and 61', the inner wall 21 of the outer casing 2, the baffles 8 and 8', and also by the pipe 9. As can be understood, FIG. 4, like the other drawings, is not necessarily drawn to scale. For example, the parts of the cross sectional area A in-between the catalysts 6 and 6' and the pipe 9 are rather positioned somewhat diagonally as can be seen in FIG. 2, and may also not necessarily be seen in a view from above.

Figure 5:
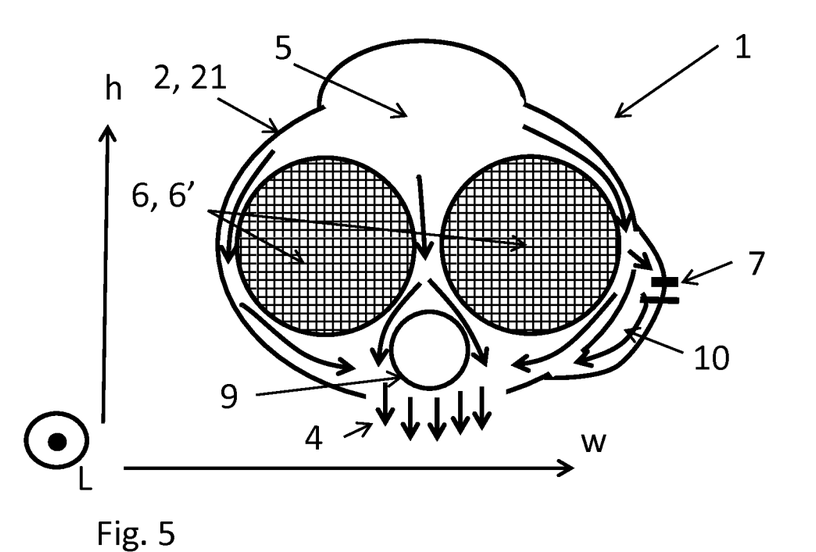
FIG. 5 is showing a cross sectional view of a system according to yet another example embodiment of the present invention.
Figure 6:
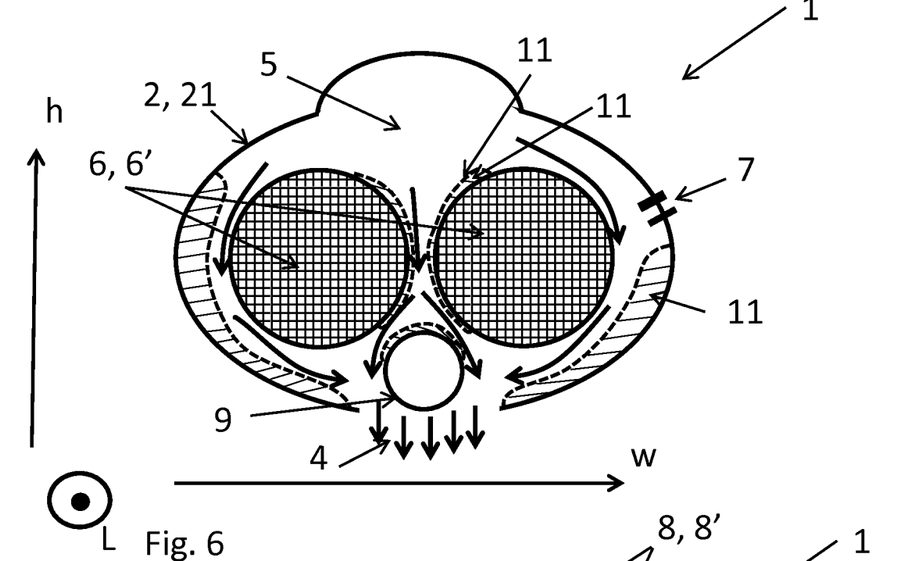
FIG. 6 is showing a cross sectional view of a system according to yet another example embodiment of the present invention.
Figure 7:
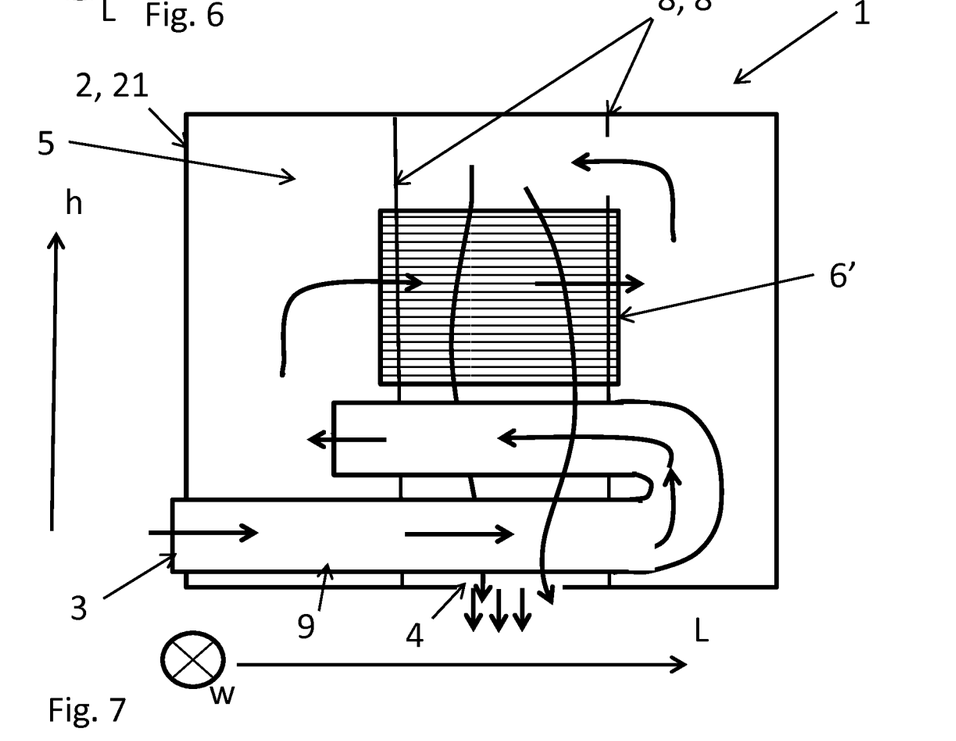
FIG. 7 is showing a cross sectional view of a system according to yet another example embodiment of the present invention.

FIGS. 5-7 show other example embodiments of a system 1 according to the present invention. In FIG. 5, showing a similar cross section as in FIG. 2, an additional flow channel 10 is located in the inner volume 5. The sensor(s) 7 is located in the additional flow channel 10. In FIG. 6, another example is shown, where absorptive material 11 is also placed in the inner volume 5 for reducing the noise level, and also for further reducing the smallest cross sectional area A which the total flow passes through. The material 11 is here connected to the inner wall 21, the catalysts 6 and 6' and also to the pipe 9. In FIG. 7, it can be seen that the pipe 9 has attained a U-shape for directing the flow a bit differently compared to the other examples. However, the flow flows also here substantially in the height direction of the system 1 when it passes through the smallest cross sectional area A in the inner volume 5.

It is to be understood that the present invention is not limited to the embodiments described above and illustrated in the drawings; rather, the skilled person will recognize that many changes and modifications may be made within the scope of the appended claims.

The invention claimed is:

1. An exhaust aftertreatment system for a combustion engine, said system comprising,
   an outer casing comprising at least one exhaust gas inlet and at least one exhaust gas outlet,
   at least one catalyst being located in an inner volume of the outer casing,
   wherein the system is configured such that during use of the system exhaust gas flows from the at least one exhaust gas inlet at an inlet velocity, through the at least one catalyst at a catalyst velocity, into the inner volume outside the at least one catalyst and to the at least one exhaust gas outlet, and further configured such that the exhaust gas flows in the inner volume outside the at least one catalyst through at least one cross sectional area being defined and limited by at least a perimeter surface of the at least one catalyst and an inner surface of the outer casing or by at least two catalyst parameter surfaces, characterized in that,
   the at least one cross sectional area is sized such that during use of the system the exhaust gas flows through the at least one cross sectional area at a first inner volume velocity being higher than the catalyst velocity, and
   wherein the system further comprises at least one sensor for measuring at least one parameter being related to the exhaust gas, said at least one sensor being located in the inner volume at a location where an exhaust gas flow velocity is higher than the catalyst velocity.

2. The system according to claim 1, wherein the system is configured such that during use of the system the exhaust gas flows through the at least one cross sectional area in a direction being substantially perpendicular to the length direction of the at least one catalyst.

3. The system according to claim 1, wherein the first inner volume velocity is at least 80%, 90%, or 100% higher than the catalyst velocity.

4. The system according to claim 1, wherein the size of the at least one cross sectional area is in a range from 30% to 300% of an inlet area of the at least one exhaust gas inlet.

5. The system according to claim 1, wherein it comprises at least two catalysts being arranged substantially parallel in respect of each other.

6. The system according to claim 1, wherein the at least one catalyst is a selective catalytic reduction catalyst.

7. The system according to claim 1, wherein the system further comprises at least one of a diesel oxidation catalyst located upstream the at least one catalyst and at least one particle filter located upstream the at least one catalyst.

8. The system according to claim 1, further comprising at least one baffle located in the inner volume and configured for further defining and limiting the at least one cross sectional area.

9. The system according to claim 8, wherein the at least one baffle is defined by a plane being substantially perpendicular to the length direction of the at least one catalyst.

10. The system according to claim 1, wherein the system further comprises a duct for the exhaust gas flow in the inner volume extending from the exhaust gas inlet and being located upstream in respect of the at least one catalyst.

11. The system according to claim 10, wherein the at least one duct is configured for further defining and limiting the at least one cross sectional area.

12. The system according to claim 1, wherein the exhaust gas outlet is a final exhaust gas outlet for the exhaust gas.

13. The system according to claim 12, wherein the exhaust gas outlet is pointing substantially downwards when the system is mounted to a vehicle.

14. The system according to claim 1, wherein the at least one catalyst comprises a substantially circular, elliptical or oval perimeter profile in a cross section along the length direction of the at least one catalyst.

15. The system according to claim 1, wherein the at least one sensor is a sensor for measuring at least one of temperature, NOx level and particle level of the exhaust gas.

16. The system according to claim 1, wherein the at least one sensor is connected to the outer casing.

17. The system according to claim 1, wherein the inner volume comprises an additional flow channel, wherein the at least one sensor is located in said additional flow channel.

18. The system according to claim 1, wherein an absorptive material is placed in the inner volume where the increased flow velocity is occurring.

19. The system according to claim 1, wherein the at least one sensor is located in the inner volume at a location where an exhaust gas flow velocity is at least 80% of the first inner volume velocity.

20. The system according to claim 1, wherein the at least one sensor is located in the proximity of the at least one cross-sectional area.

21. A vehicle comprising the system according to claim 1.

* * * * *